United States Patent
Chen

(10) Patent No.: US 11,480,770 B2
(45) Date of Patent: Oct. 25, 2022

(54) CAMERA OPTICAL LENS INCLUDING SEVEN LENSES OF ++−+−+− REFRACTIVE POWERS

(71) Applicant: AAC Optics Solutions Pte. Ltd., Singapore (SG)

(72) Inventor: Jia Chen, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 309 days.

(21) Appl. No.: 16/941,567

(22) Filed: Jul. 29, 2020

(65) Prior Publication Data

US 2021/0048636 A1 Feb. 18, 2021

(30) Foreign Application Priority Data

Aug. 16, 2019 (CN) .......................... 201910760418.5

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2019/0361196 A1* 11/2019 Chang ................ G02B 13/0045

* cited by examiner

*Primary Examiner* — Wen Huang
(74) *Attorney, Agent, or Firm* — W&G Law Group

(57) ABSTRACT

The present disclosure a camera optical lens is provided including, from an object side to an image side: a first lens having a positive refractive power; a second lens having a positive refractive power; a third lens having a negative refractive power; a fourth lens having a positive refractive power; a fifth lens having a negative refractive power; a sixth lens having a positive refractive power; and a seventh lens having a negative refractive power. The camera optical lens satisfies following conditions: $-20.00 \leq f5/f \leq -8.00$; $2.80 \leq v2/v3 \leq 4.50$; and $-25.00 \leq (R9+R10)/(R9-R10) \leq -14.00$. The camera optical lens can achieve good optical performance while meeting the design requirements for large aperture, wild angle and ultra-thinness.

10 Claims, 9 Drawing Sheets

//CAMERA OPTICAL LENS INCLUDING SEVEN LENSES OF ++−+−+− REFRACTIVE POWERS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a four-piece, five-piece or six-piece lens structure. However, with the development of technology and the increase of the diverse demands of users, and as the pixel area of photosensitive devices is becoming smaller and smaller and the requirement of the system on the imaging quality is improving constantly, the seven-piece lens structure gradually appears in lens designs. Although the typical seven-piece lens already has good optical performance, its optical power, lens spacing and lens shape remain unreasonable to some extents, resulting in that the lens structure, which, even though, has excellent optical performance, is not able to meet the design requirement for large aperture, long focal length and ultra-thinness.

SUMMARY

To address the above issues, at least one object of the present disclosure is to provide a camera optical lens that meet a design requirement of large aperture, wild angle and ultra-thinness while having excellent optical performance.

For solving the aforementioned problem, a camera optical lens is provided, including, from an object side to an image side: a first lens having a positive refractive power; a second lens having a positive refractive power; a third lens having a negative refractive power; a fourth lens having a positive refractive power; a fifth lens having a negative refractive power; a sixth lens having a positive refractive power; and a seventh lens having a negative refractive power. The camera optical lens satisfies following conditions: $-20.00 \leq f5/f \leq -8.00$; $2.80 \leq v2/v3 \leq 4.50$; and $-25.00 \leq (R9+R10)/(R9-R10) \leq -14.00$; where f5 denotes a focal length of the fifth lens; f denotes a focal length of the camera optical lens; v2 denotes an abbe number of the second lens; v3 denotes an abbe number of the third lens; R9 denotes a curvature radius of the object-side surface of the fifth lens; and R10 denotes a curvature radius of the image-side surface of the fifth lens.

In one embodiment, the camera optical lens further satisfies a condition of: $9.00 \leq d3/d4 \leq 15.00$; where d3 denotes an on-axis thickness of the second lens; and d4 denotes an on-axis distance from the image-side surface of the second lens to the object-side surface of the third lens.

In one embodiment, the camera optical lens further satisfies following conditions: $-20.00 \leq (R11+R12)/(R11-R12) \leq -6.00$; where R11 denotes a curvature radius of the object-side surface of the sixth lens; and R12 denotes a curvature radius of the image-side surface of the sixth lens.

In one embodiment, wherein the camera optical lens further satisfies following conditions: $0.68 \leq f1/f \leq 6.76$; $-20.74 \leq (R1+R2)/(R1-R2) \leq -1.35$; and $0.03 \leq d1/TTL \leq 0.14$; where f1 denotes a focal length of the first lens; R1 denotes a curvature radius of the object-side surface of the first lens; and R2 denotes a curvature radius of the image-side surface of the first lens; d1 denotes an on-axis thickness of the first lens; and TTL denotes a total optical length from the object-side surface of the first lens to an image surface of the camera optical lens along an optical axis.

In one embodiment, the camera optical lens further satisfies following conditions: $0.54 \leq f2/f \leq 3.46$; $-2.26 \leq (R3+R4)/(R3-R4) \leq -0.55$; and $0.04 \leq d3/TTL \leq 0.19$; where f2 denotes a focal length of the second lens; R3 denotes a curvature radius of the object-side surface of the second lens; R4 denotes a curvature radius of the image-side surface of the second lens; d3 denotes an on-axis thickness of the second lens; and TTL denotes a total optical length from the object-side surface of the first lens to an image surface of the camera optical lens along an optical axis.

In one embodiment, the camera optical lens further satisfies following conditions: $-5.66 \leq f3/f \leq -1.22$; $1.67 \leq (R5+R6)/(R5-R6) \leq 9.54$; and $0.02 \leq d5/TTL \leq 0.06$; where f3 denotes a focal length of the third lens; R5 denotes a curvature radius of the object-side surface of the third lens; R6 denotes a curvature radius of the image-side surface of the third lens; d5 denotes an on-axis thickness of the third lens; and TTL denotes a total optical length from the object-side surface of the first lens to an image surface of the camera optical lens along an optical axis.

In one embodiment, the camera optical lens further satisfies following conditions: $1.17 \leq f4/f \leq 4.40$; $-0.64 \leq (R7+R8)/(R7-R8) \leq 0.87$; and $0.04 \leq d7/TTL \leq 0.18$; where f4 donates a focal length of the fourth lens; R7 denotes a curvature radius of the object-side surface of the fourth lens; R8 denotes a curvature radius of the image-side surface of the fourth lens; d7 denotes an on-axis thickness of the fourth lens; and TTL denotes a total optical length from the object-side surface of the first lens to an image surface of the camera optical lens along an optical axis.

In one embodiment, wherein the camera optical lens further satisfies a condition of: $1.46 \leq f6/f \leq 8.78$; $0.04 \leq d11/TTL \leq 0.15$; where f6 denotes a focal length of the sixth lens; d11 denotes an on-axis thickness of the sixth lens; and TTL denotes a total optical length from the object-side surface of the first lens to an image surface of the camera optical lens along an optical axis.

In one embodiment, wherein the camera optical lens further satisfies a condition of: $-2.80 \leq f7/f \leq -0.84$; $0.93 \leq (R13+R14)/(R13-R14) \leq 3.18$; and $0.07 \leq d13/TTL \leq 0.23$; where f7 donates a focal length of the seventh lens; R13 donates a curvature radius of the object-side surface of the seventh lens; R14 donates a curvature radius of the image-side surface of the seventh lens; d13 donates an on-axis thickness of the seventh lens; and TTL denotes a total optical length from the object-side surface of the first lens to an image surface of the camera optical lens along an optical axis.

In one embodiment, the camera optical lens further satisfies a condition of: Fno≤1.61; where Fno denotes an F number of the camera optical lens.

The present disclosure is advantageous in: the camera optical lens in the present disclosure has good optical performance and has characteristics of large aperture, wild angle and ultra-thinness, and is especially applicable to mobile phone camera lens assemblies and WEB camera lenses composed by such camera elements as CCD and CMOS for high pixels.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
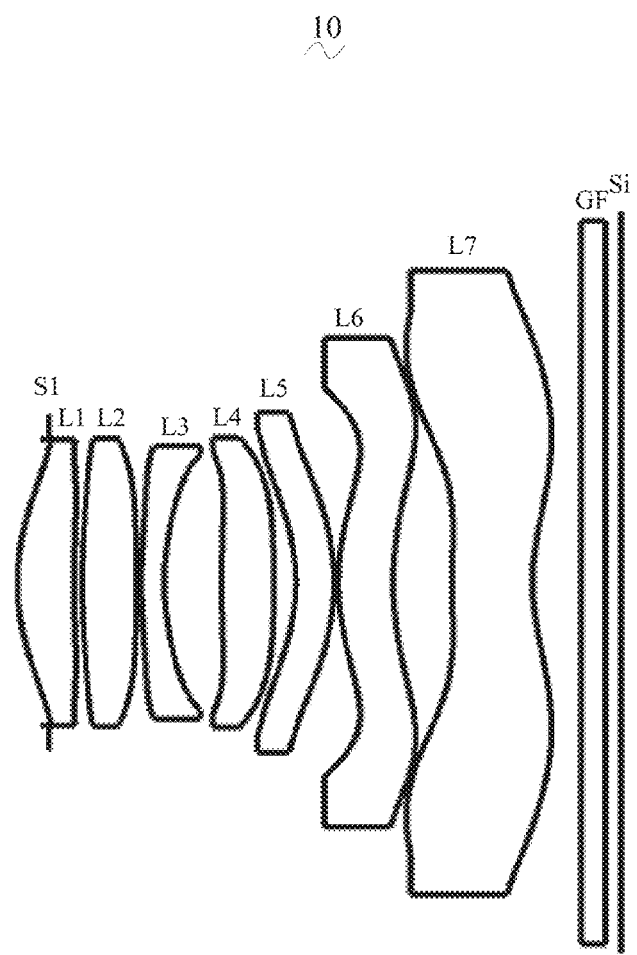
FIG. 1 is a schematic diagram of a structure of a camera optical lens according to Embodiment 1 of the present disclosure.

Referring to the accompanying drawing, the present disclosure provides a camera optical lens 10. FIG. 1 shows a camera optical lens 10 of Embodiment 1 of the present disclosure, and the camera optical lens 10 includes five lenses. Specifically, the camera optical lens 10 includes, from the object side to the image side: an aperture S1, a first lens L1 having a positive refractive power, a second lens L2 having a positive refractive power, a third lens L3 having a negative refractive power, a fourth lens L4 having a positive refractive power, a fifth lens L5 having a negative refractive power, a sixth lens L6 having a positive refractive power and a seventh lens L7 having a negative refractive power. Optical elements such as a filter GF and the like may be provided between the seventh lens L7 and an image surface Si.

In this embodiment, a focal length of the fifth lens L5 is defined as f5, an overall focal length of the camera optical lens system is defined as f, and the camera optical lens 10 satisfies a condition of $-20.00 \leq f5/f \leq -8.00$, which specifies a ratio of the focal length of the fifth lens L5 to the overall focal length of the system. With reasonable distribution of the focal power, the system has better imaging quality and lower sensitivity.

An abbe number of the second lens L2 is defined as v2, an abbe number of the third lens L3 is defined as v3, and the camera optical lens 10 satisfies a condition of $2.80 \leq v2/v3 \leq 4.50$, which specifies a ratio of the abbe number of the second lens L2 to the abbe number of the third lens L3. Within this range, the development of the lenses towards ultra-thinness is facilitated, and thus the correction of the aberration is facilitated.

A curvature radius of the object-side surface of the fifth lens L5 is defined as R9, a curvature radius of the image-side surface of the fifth lens L5 is defined as R10, and the camera optical lens 10 satisfies a condition of $-25.00 \leq (R9+R10)/(R9-R10) \leq -14.00$, which specifies a shape of the fifth lens L5. Within this range, the development of the lenses towards ultra-thinness and wide angle is facilitated, and thus the correction of the aberration is facilitated.

An on-axis thickness of the second lens L2 is defines as d3, an on-axis distance from the image-side surface of the second lens L2 to the object-side surface of the third lens L3 is defined as d4, and the camera optical lens 10 satisfies a condition of $9.00 \leq d3/d4 \leq 15.00$, which specifies a ratio between the on-axis thickness of the second lens L2 and the on-axis distance from the image-side surface of the second lens L2 to the object-side surface of the third lens L3. Within this range, the reduction of the overall length of the optical system is facilitated and ultra-thin effect is achieved.

A curvature radius of an object-side surface of the sixth lens L6 is defined as R11, a curvature radius of an image-side surface of the sixth lens L6 is defined as R12, and the camera optical lens 10 satisfies a condition of $-20.00 \leq (R11+R12)/(R11-R12) \leq -6.00$, which specifies a shape of the sixth lens L6. Within this range, the correction of the off-axis aberration is facilitated.

An overall focal length of the camera optical lens system is defined as f, a focal length of the first lens is defined as f1, and the camera optical lens 10 satisfies a condition of $0.68 \leq f1/f \leq 6.76$, which specifies a ratio of the focal length of the first lens L1 to the overall focal length of the system. Within this range, the first lens L1 has an appropriate positive refractive power, the correction of the aberration of the system is facilitated, and meanwhile the development of the lenses towards ultra-thinness and wide angle is facilitated.

A curvature radius of an object-side surface of the first lens L1 is defined as R1, a curvature radius of an image-side surface of the first lens L1 is defined as R2, and the camera optical lens 10 satisfies a condition of −20.74≤(R1+R2)/(R1−R2)≤−1.35. This can reasonably control a shape of the first lens L1 in such a manner that the first lens L1 can effectively correct a spherical aberration of the camera optical lens.

An on-axis thickness of the first lens L1 is defined as d1, an overall optical length from the object side surface of the first lens L1 to an image surface Si of the camera optical lens 10 along an optical axis is defined as TTL, and the camera optical lens 10 satisfies a condition of 0.03≤d1/TTL≤0.14. This can facilitate achieving ultra-thinness of the lenses.

The overall focal length of the camera optical lens system is defined as f, a focal length of the second lens L2 is defined as f2, and the camera optical lens 10 satisfies a condition of 0.54≤f2/f≤3.46, which specifies a ratio of the focal length of the second lens L2 to the overall focal length of the system. This can reasonably control a positive focal power of the second lens L2 in such a manner that the correction of the aberration of the optical system is facilitated.

A curvature radius of the object-side surface of the second lens L2 is defined as R3, a curvature radius of the image-side surface of the second lens L2 is defined as R4, and the camera optical lens 10 satisfies a condition of −2.26≤(R3+R4)/(R3−R4)≤−0.55, which specifies a shape of the second lens L2. Within this range, the development of the lenses towards ultra-thinness and wide angle would facilitate correcting the on-axis aberration.

A curvature radius of the object-side surface of the second lens L2 is defined as R3, a curvature radius of the image-side surface of the second lens L2 is defined as R4, and the camera optical lens 10 satisfies a condition of −2.26≤(R3+R4)/(R3−R4)≤−0.55, which specifies a shape of the second lens L2. Within this range, the development of the lenses towards ultra-thinness and wide angle would facilitate correcting the on-axis aberration.

An on-axis thickness of the second lens L2 is defines as d3, the overall optical length of the camera optical lens 10 is defined as TTL, and the camera optical lens 10 satisfies a condition of 0.04≤d3/TTL≤0.19. This can facilitate achieving ultra-thinness of the lenses.

A focal length of the third lens L3 is defined as f3, the overall focal length of the camera optical lens system is defined as f, and the camera optical lens 10 satisfies a condition of −5.66≤f3/f≤−1.22. With reasonable distribution of the focal power, the system has better imaging quality and lower sensitivity.

A curvature radius of the object-side surface of the third lens L3 is defined as R5, a curvature radius of the image-side surface of the third lens L3 is defined as R6, and the camera optical lens 10 satisfies a condition of 1.67≤(R5+R6)/(R5−R6)≤9.54, which specifies and effectively controls a shape of the third lens L3. Within this range, the deflection degree of the light passing through the lens can be alleviated, and the aberration can be effectively reduced.

An on-axis thickness of the third lens L3 is defined as d5, the overall optical length of the camera optical lens 10 is defined as TTL, and the camera optical lens 10 satisfies a condition of 0.02≤d5/TTL≤0.06. This can facilitate achieving ultra-thinness of the lenses.

A focal length of the fourth lens L4 is defined as f4, the overall focal length of the camera optical lens system is defined as f, and the camera optical lens 10 satisfies a condition of 1.17≤f4/f≤4.40, which specifies a ratio of the focal length of the fourth lens L4 to the overall focal length of the camera optical lens system. Within this range, improvement of the performance of the optical system is facilitated.

A curvature radius of the object-side surface of the fourth lens L4 is defined as R7, a curvature radius of the image-side surface of the fourth lens L4 is defined as R8, and the camera optical lens 10 satisfies a condition of −0.64≤(R7+R8)/(R7−R8)≤0.87, which specifies a shape of the fourth lens L4. Within this range, the development of the lenses towards wide angle would facilitate correcting the off-axis aberration.

An on-axis thickness of the fourth lens L4 is defined as d7, the overall optical length of the camera optical lens 10 is defined as TTL, and the camera optical lens 10 satisfies a condition of 0.04≤d7/TTL≤0.18. This can facilitate achieving ultra-thinness of the lenses.

A focal length of the sixth lens L6 is defined as f6, the overall focal length of the camera optical lens system is defined as f, and the camera optical lens 10 satisfies a condition of 1.46≤f6/f≤8.78. Within this range, the system has better imaging quality and lower sensitivity with reasonable distribution of the focal power.

An on-axis thickness of the sixth lens L6 is defined as d11, the overall optical length of the camera optical lens 10 is defined as TTL, and the camera optical lens 10 satisfies a condition of 0.04≤d11/TTL≤0.15. This can facilitate achieving ultra-thinness of the lenses.

A focal length of the seventh lens L7 is defined as f7, the overall focal length of the camera optical lens system is defined as f, and the camera optical lens 10 satisfies a condition of −2.80≤f7/f≤−0.84. With reasonable distribution of the focal power, the system has better imaging quality and lower sensitivity.

A curvature radius of the object-side surface of the seventh lens L7 is defined as R13, a curvature radius of the image-side surface of the seventh lens L7 is defined as R14, and the camera optical lens 10 satisfies a condition of 0.93≤(R7+R8)/(R7−R8)≤3.18, which specifies a shape of the seventh lens L7. Within this range, the development of the lenses towards wide angle would facilitate correcting the off-axis aberration.

An on-axis thickness of the seventh lens L7 is defined as d13, the overall optical length of the camera optical lens 10 is defined as TTL, and the camera optical lens satisfies a condition of 0.07≤d13/TTL≤0.23. This can facilitate achieving ultra-thinness of the lenses.

Further, the overall optical length of the camera optical lens 10 is defined as TTL, an image height of the camera optical lens 10 is IH, and the camera optical lens 10 satisfies a condition of TTL/IH≤1.57, which facilitates ultra-thinness of the lenses. An F number of the camera optical lens 10 is defined as Fno, and the camera optical lens 10 satisfies a condition of Fno≤1.61. This facilitates achieving large aperture of the lenses and thus better imaging performance. A field of view in the diagonal direction is defined as Fov, and the camera optical lens 10 satisfies a condition of Fov≥77.00°. This facilitates achieving wild angle of the lenses. That is, when the above relationships are satisfied, the camera optical lens 10 meets the design requirements of large aperture, wiled angle and ultra-thinness while having excellent optical imaging performance. Based on the characteristics of the camera optical lens 10, the camera optical lens 10 is particularly applicable to mobile camera lens assemblies and a WEB camera lenses composed of such camera elements as CCD and CMOS for high pixels.

The camera optical lens 10 will be further described with reference to the following examples. Symbols used in various examples are shown as follows. The focal length, on-axis distance, curvature radius, on-axis thickness, inflexion point position, and arrest point position are all in units of mm.

TTL: Overall optical length (the distance from the object side surface of the first lens L1 to the image surface Si of the camera optical lens along the optical axis) in mm.

Typically, inflexion points and/or arrest points can be arranged on the object-side surface and/or the image-side surface of each lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|     | R       | d          |     |        |    |       |
|-----|---------|------------|-----|--------|----|-------|
| S1  | ∞       | d0 = −0.280 |     |        |    |       |
| R1  | 2.152   | d1 = 0.496 | nd1 | 1.5450 | v1 | 55.81 |
| R2  | 6.353   | d2 = 0.072 |     |        |    |       |
| R3  | 5.389   | d3 = 0.479 | nd2 | 1.5264 | v2 | 76.86 |
| R4  | −87.862 | d4 = 0.044 |     |        |    |       |
| R5  | 4.070   | d5 = 0.201 | nd3 | 1.6400 | v3 | 23.54 |
| R6  | 2.192   | d6 = 0.507 |     |        |    |       |
| R7  | 8.184   | d7 = 0.461 | nd4 | 1.5450 | v4 | 55.81 |
| R8  | −15.959 | d8 = 0.193 |     |        |    |       |
| R9  | −1.830  | d9 = 0.336 | nd5 | 1.6400 | v5 | 23.54 |
| R10 | −2.093  | d10 = 0.038 |    |        |    |       |
| R11 | 2.190   | d11 = 0.484 | nd6 | 1.5450 | v6 | 55.81 |
| R12 | 2.790   | d12 = 0.519 |    |        |    |       |
| R13 | 6.270   | d13 0.707  | nd7 | 1.5346 | N7 | 55.69 |
| R14 | 1.875   | d14 0.432  |     |        |    |       |
| R15 | ∞       | d15 0.210  | ndg | 1.5168 | vg | 64.17 |
| R16 | ∞       | d16 0.143  |     |        |    |       |

In the table, meanings of various symbols will be described as follows.

S1: aperture;

R: curvature radius of an optical surface, a central curvature radius for a lens;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the sixth lens L6;

R12: curvature radius of the image-side surface of the sixth lens L6;

R13: curvature radius of the object-side surface of the seventh lens L7;

R14: curvature radius of the image-side surface of the seventh lens L7;

R15: curvature radius of an object-side surface of the optical filter GF;

R16: curvature radius of an image-side surface of the optical filter GF;

d: on-axis thickness of a lens and an on-axis distance between lens;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the optical filter GF;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the optical filter GF;

d15: on-axis thickness of the optical filter GF;

d16: on-axis distance from the image-side surface to the image surface of the optical filter GF;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

nd7: refractive index of the d line of the seventh lens L7;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

vg: abbe number of the optical filter GF.

Table 2 shows aspherical surface data of the camera optical lens 10 in Embodiment 1 of the present disclosure.

TABLE 2

| | Conic coefficient | Aspheric surface coefficients | | | |
|---|---|---|---|---|---|
| | k | A4 | A6 | A8 | A10 |
| R1 | −8.5188E−01 | −2.0555E−02 | 3.2089E−02 | −8.8580E−02 | 1.0031E−01 |
| R2 | −1.5000E+02 | −4.2818E−02 | −3.9808E−03 | 7.6075E−03 | 1.5654E−03 |
| R3 | −8.5633E+01 | −2.1316E−02 | −4.2773E−05 | 2.2471E−02 | −2.4957E−02 |
| R4 | −3.0527E+02 | −7.9049E−02 | 1.0725E−01 | −1.5797E−01 | 1.2091E−01 |
| R5 | −8.5900E+00 | −1.7076E−01 | 2.5627E−01 | −3.1251E−01 | 2.8314E−01 |
| R6 | 1.8514E+00 | −1.7029E−01 | 2.3168E−01 | −3.6496E−01 | 4.6374E−01 |
| R7 | 3.3669E+01 | −5.8960E−02 | −1.0659E−02 | −1.8170E−02 | 2.1594E−02 |
| R8 | 1.2999E+02 | −8.3104E−02 | 4.9998E−02 | −6.7976E−02 | 2.9270E−02 |
| R9 | −6.1420E−01 | 7.2525E−02 | 7.3848E−03 | −9.8844E−02 | 1.3120E−01 |
| R10 | −2.3697E−02 | 8.3382E−02 | −9.5053E−02 | 8.0012E−02 | −3.5569E−02 |
| R11 | −9.2303E+00 | 5.7296E−02 | −9.7983E−02 | 6.0108E−02 | −2.8698E−02 |
| R12 | −2.4251E+01 | 5.9407E−02 | −4.4369E−02 | 8.3045E−03 | −5.2220E−04 |
| R13 | 2.3384E+00 | −2.0747E−01 | 8.0529E−02 | −1.4892E−02 | 1.4027E−03 |
| R14 | −6.3814E−01 | −1.8679E−01 | 7.9571E−02 | −2.7268E−02 | 6.0976E−03 |

| | Aspheric surface coefficients | | | | |
|---|---|---|---|---|---|
| | A12 | A14 | A16 | A18 | A20 |
| R1 | −6.9292E−02 | 2.1951E−02 | 1.1233E−04 | −1.0314E−03 | 1.6175E−05 |
| R2 | −5.3033E−04 | −3.9676E−04 | 2.5394E−05 | 1.9780E−04 | 8.8623E−06 |
| R3 | 2.4212E−02 | −6.8289E−03 | −6.0551E−03 | 3.6688E−03 | −4.1260E−04 |
| R4 | −4.8625E−02 | 9.0259E−03 | −1.2379E−03 | 4.2178E−04 | −1.2664E−05 |
| R5 | −1.4705E−01 | 2.3459E−02 | 2.0914E−02 | −1.3129E−02 | 2.2909E−03 |
| R6 | −3.6590E−01 | 1.4872E−01 | −2.2460E−02 | 5.1202E−03 | −3.4434E−03 |
| R7 | −2.1792E−02 | 2.6742E−02 | 1.9154E−03 | 1.6328E−03 | −2.8649E−04 |
| R8 | 1.3034E−02 | −1.6214E−02 | 4.2283E−03 | −7.3090E−05 | 5.4560E−06 |
| R9 | −6.3986E−02 | 1.0676E−02 | 1.4202E−06 | 2.4754E−04 | −1.2530E−04 |
| R10 | 1.1414E−02 | −1.9781E−03 | 1.4296E−05 | −5.2666E−05 | 2.2375E−05 |
| R11 | 6.7792E−03 | −3.8724E−04 | −3.1162E−05 | −1.9242E−05 | 4.2304E−06 |
| R12 | 2.2945E−05 | −2.5263E−06 | −1.8446E−07 | −1.7583E−08 | 6.6033E−09 |
| R13 | −3.8253E−05 | −4.1386E−06 | 2.7815E−07 | 2.2774E−09 | −2.3954E−10 |
| R14 | −8.3151E−04 | 6.5237E−05 | −2.8070E−06 | 7.7877E−08 | −2.1560E−09 |

In table 2, K is a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of each lens of the camera optical lens 10 according to Embodiment 1. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6, and P7R1 and P7R2 represent the object-side surface and the image-side surface of the seventh lens L7. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 |
|---|---|---|---|
| P1R1 | 2 | 0.935 | 1.245 |
| P1R2 | 2 | 0.395 | 1.055 |
| P2R1 | 0 | 0 | 0 |
| P2R2 | 0 | 0 | 0 |
| P3R1 | 2 | 0.465 | 0.775 |
| P3R2 | 0 | 0 | 0 |
| P4R1 | 2 | 0.425 | 1.145 |
| P4R2 | 0 | 0 | 0 |
| P5R1 | 2 | 0.915 | 1.265 |
| P5R2 | 2 | 1.065 | 1.405 |
| P6R1 | 2 | 0.765 | 1.735 |
| P6R2 | 2 | 0.895 | 1.975 |
| P7R1 | 2 | 0.265 | 1.395 |
| P7R2 | 2 | 0.605 | 2.555 |

TABLE 4

| | Number(s) of arrest points | Arrest point position 1 | Arrest point position 2 |
|---|---|---|---|
| P1R1 | 0 | 0 | 0 |
| P1R2 | 2 | 0.745 | 1.195 |
| P2R1 | 0 | 0 | 0 |
| P2R2 | 0 | 0 | 0 |
| P3R1 | 0 | 0 | 0 |
| P3R2 | 0 | 0 | 0 |
| P4R1 | 1 | 0.695 | 0 |
| P4R2 | 0 | 0 | 0 |
| P5R1 | 0 | 0 | 0 |
| P5R2 | 0 | 0 | 0 |
| P6R1 | 1 | 1.205 | 0 |

TABLE 4-continued

| | Number(s) of arrest points | Arrest point position 1 | Arrest point position 2 |
|---|---|---|---|
| P6R2 | 1 | 1.415 | 0 |
| P7R1 | 2 | 0.475 | 2.145 |
| P7R2 | 1 | 1.345 | 0 |

Figure 2:
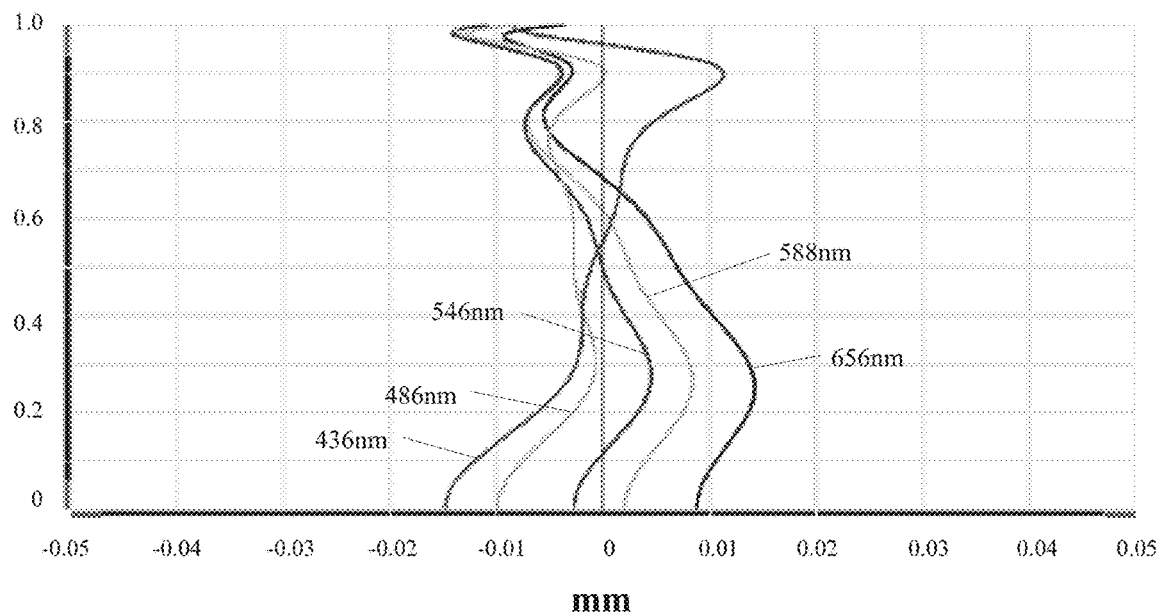
FIG. 2 is a schematic diagram of a longitudinal aberration of the camera optical lens shown in FIG. 1.
Figure 3:
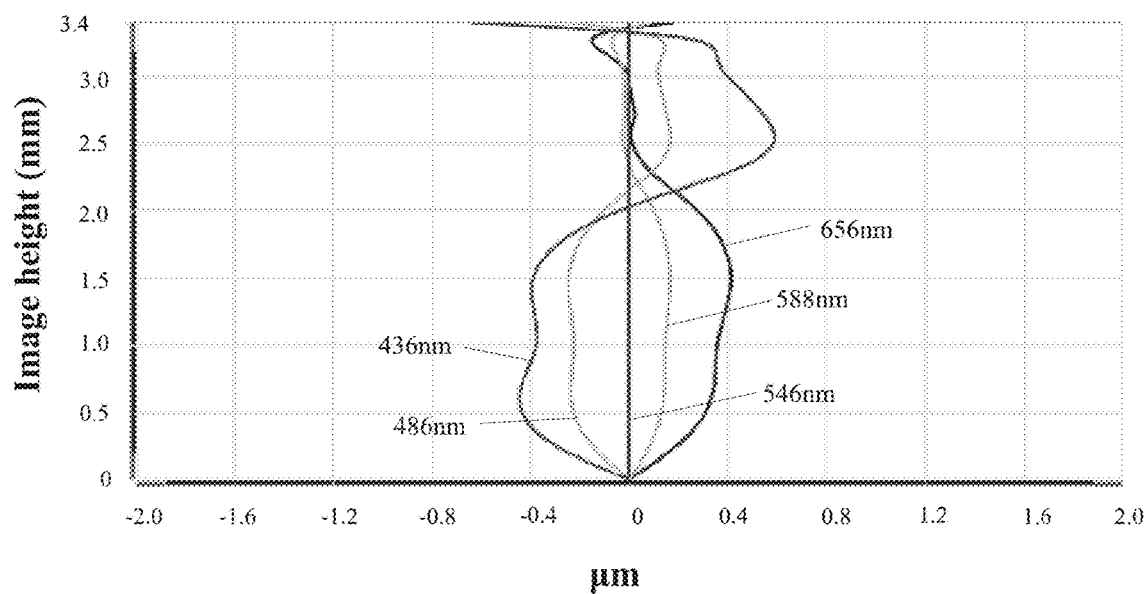
FIG. 3 is a schematic diagram of a lateral color of the camera optical lens shown in FIG. 1.
Figure 4:
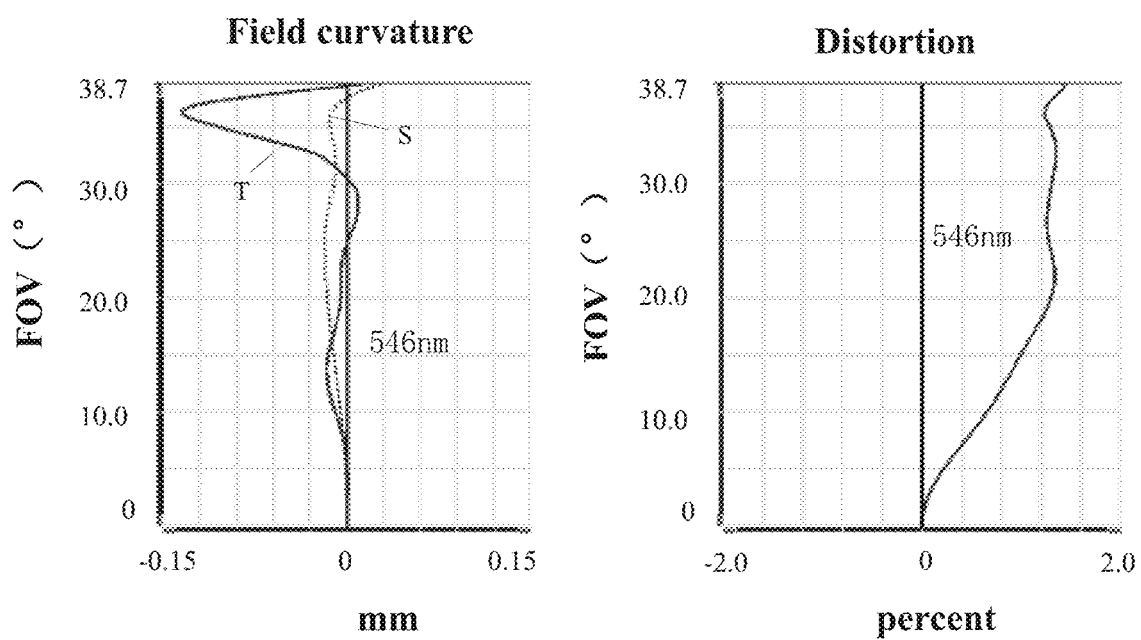
FIG. 4 is a schematic diagram of a field curvature and a distortion of the camera optical lens shown in FIG. 1.

FIG. 2 illustrates a longitudinal aberration of light with wavelengths of 436 nm, 486 nm, 546 nm, 588 nm and 656 nm after passing the camera optical lens 10, respectively. FIG. 3 illustrates a lateral color of light with wavelengths of 436 nm, 486 nm, 546 nm, 588 nm and 656 nm after passing the camera optical lens 10, respectively. FIG. 4 illustrates a field curvature and a distortion with a wavelength of 546 nm after passing the camera optical lens 10. A field curvature S in FIG. 4 is a field curvature in a sagittal direction, and T is a field curvature in a tangential direction.

In the subsequent Table 13, various parameters of Embodiments 1, 2 and 3 and values corresponding to the parameters specified in the above conditions are shown.

As shown in Table 13, Embodiment 1 satisfies the various conditions.

In this Embodiment, an entrance pupil diameter of the camera optical lens 10 is 2.610 mm, an image height of 1.0 H is 3.400 mm, and an FOV (field of view) in a diagonal direction is 77.40°. Thus, the camera optical lens 10 achieves large aperture, wild angle and ultra-thinness, the on-axis and off-axis aberration is sufficiently corrected, thereby achieving excellent optical performance.

Embodiment 2

Embodiment 2, which provides a camera optical lens 20 structurally shown in

Figure 5:
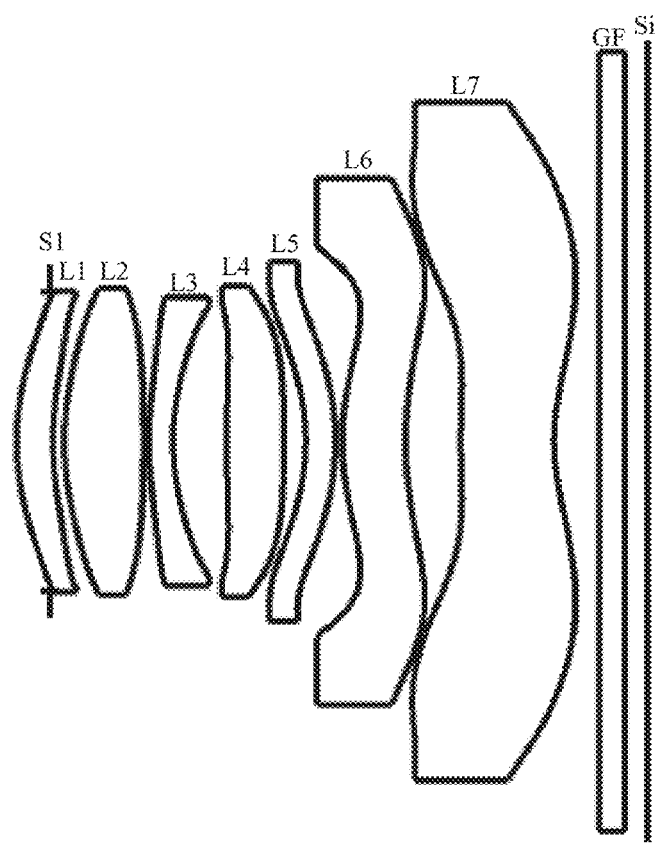
FIG. 5 is a schematic diagram of a structure of a camera optical lens according to Embodiment 2 of the present disclosure.

FIG. 5, is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | | nd | | vd |
|---|---|---|---|---|---|---|
| S1 | ∞ | d0 = | −0.280 | | | |
| R1 | 2.178 | d1 = | 0.305 | nd1 | 1.5450 | v1 | 55.81 |
| R2 | 2.643 | d2 = | 0.094 | | | |
| R3 | 2.391 | d3 = | 0.658 | nd2 | 1.4978 | v2 | 66.95 |
| R4 | −25.516 | d4 = | 0.044 | | | |
| R5 | 3.178 | d5 = | 0.200 | nd3 | 1.6400 | v3 | 23.54 |
| R6 | 1.949 | d6 = | 0.448 | | | |
| R7 | 10.550 | d7 = | 0.475 | nd4 | 1.5450 | v4 | 55.81 |
| R8 | −16.988 | d8 = | 0.183 | | | |
| R9 | −1.829 | d9 = | 0.246 | nd5 | 1.6400 | v5 | 23.54 |
| R10 | −2.109 | d10 = | 0.055 | | | |
| R11 | 2.246 | d11 = | 0.527 | nd6 | 1.5450 | v6 | 55.81 |
| R12 | 3.142 | d12 = | 0.460 | | | |
| R13 | 5.914 | d13 | 0.774 | nd7 | 1.5346 | N7 | 55.69 |
| R14 | 1.824 | d14 | 0.378 | | | |
| R15 | ∞ | d15 | 0.210 | ndg | 1.5168 | vg | 64.17 |
| R16 | ∞ | d16 | 0.193 | | | |

Table 6 shows aspherical surface data of each lens of the camera optical lens 20 in Embodiment 2 of the present disclosure.

TABLE 6

| | Conic coefficient | Aspheric surface coefficients | | | |
|---|---|---|---|---|---|
| | k | A4 | A6 | A8 | A10 |
| R1 | −1.3672E+00 | −2.7372E−02 | 3.3315E−02 | −8.4852E−02 | 1.0122E−01 |
| R2 | −9.1043E+00 | −4.0931E−02 | −7.3533E−03 | 1.2676E−02 | 4.2893E−03 |
| R3 | −4.2659E+00 | −3.1920E−02 | −1.7666E−03 | 2.5061E−02 | −2.3757E−02 |
| R4 | −1.8834E+02 | −6.6896E−02 | 9.3993E−02 | −1.4696E−01 | 1.1853E−01 |
| R5 | 9.1276E−01 | −1.6633E−01 | 2.2999E−01 | −3.1266E−01 | 2.8566E−01 |
| R6 | 1.2045E+00 | −1.6031E−01 | 2.1548E−01 | −3.8134E−01 | 4.6633E−01 |
| R7 | 5.7497E+01 | −4.8216E−02 | −5.0263E−03 | −3.2552E−03 | 1.6517E−02 |
| R8 | 1.5191E+02 | −1.0516E−01 | 7.8914E−02 | −9.0206E−02 | 4.1852E−02 |
| R9 | −6.8918E−01 | 8.1325E−02 | −1.2347E−02 | −9.3316E−02 | 1.3194E−01 |
| R10 | 5.4784E−02 | 8.3944E−02 | −9.3173E−02 | 8.1737E−02 | −4.4452E−02 |
| R11 | −1.1850E+01 | 4.8937E−02 | −9.8078E−02 | 6.0663E−02 | −3.5223E−02 |
| R12 | −3.2080E+01 | 5.7304E−02 | −4.6094E−02 | 8.6995E−03 | −4.5049E−04 |
| R13 | 1.5670E+00 | −2.0755E−01 | 8.0537E−02 | −1.4919E−02 | 1.4047E−03 |
| R14 | −6.5206E−01 | −1.8655E−01 | 7.9084E−02 | −2.7300E−02 | 6.0977E−03 |

| | Aspheric surface coefficients | | | | |
|---|---|---|---|---|---|
| | A12 | A14 | A16 | A18 | A20 |
| R1 | −6.7529E−02 | 2.2598E−02 | −3.8958E−04 | −1.5358E−03 | 1.7750E−04 |
| R2 | −7.8113E−04 | −9.5382E−04 | 3.2143E−04 | 6.0730E−04 | −3.5173E−04 |
| R3 | 2.2112E−02 | −6.9772E−03 | −4.8926E−03 | 4.1386E−03 | −8.9734E−04 |
| R4 | −4.9485E−02 | 1.0355E−02 | −9.7608E−03 | −8.0131E−03 | 2.2031E−05 |
| R5 | −1.4282E−01 | 2.2102E−02 | 1.9695E−02 | −1.3379E−02 | 2.5619E−03 |
| R6 | −3.5559E−01 | 1.4782E−01 | −2.6142E−02 | 3.3806E−03 | −2.0806E−03 |
| R7 | −2.5396E−02 | 2.6699E−03 | 2.5066E−03 | 2.2351E−03 | −6.0550E−04 |
| R8 | 9.2226E−03 | −1.7285E−02 | 6.7740E−03 | −2.0113E−03 | 6.1843E−04 |
| R9 | −6.0446E−02 | 5.9726E−03 | 3.7865E−03 | −1.3920E−03 | 1.5751E−04 |
| R10 | 2.0128E−02 | −3.6952E−03 | −5.9023E−04 | 1.4724E−04 | 1.9033E−05 |
| R11 | 1.0516E−02 | −7.9934E−06 | −1.2366E−03 | 4.2121E−04 | −4.3887E−05 |
| R12 | 1.7735E−05 | −5.5711E−06 | −2.4912E−07 | 6.7356E−08 | −5.2689E−10 |
| R13 | −3.9694E−05 | −4.0642E−06 | 2.9666E−07 | 3.7769E−09 | −5.1441E−10 |
| R14 | −8.3045E−04 | 6.5273E−05 | −2.8203E−06 | 7.6254E−08 | −1.9758E−09 |

Table 7 and table 8 show design data of inflexion points and arrest points of each lens of the camera optical lens 20 in Embodiment 2 of the present disclosure.

TABLE 7

| | Number(s) of inflexion points | Inflexion point position 1 | Inflexion point position 2 | Inflexion point position 3 |
|---|---|---|---|---|
| P1R1 | 0 | 0 | 0 | 0 |
| P1R2 | 2 | 0.705 | 0.815 | 0 |
| P2R1 | 1 | 1.265 | 0 | 0 |
| P2R2 | 0 | 0 | 0 | 0 |
| P3R1 | 0 | 0 | 0 | 0 |
| P3R2 | 0 | 0 | 0 | 0 |
| P4R1 | 2 | 0.435 | 1.135 | 0 |
| P4R2 | 1 | 1.255 | 0 | 0 |
| P5R1 | 2 | 0.925 | 1.425 | 0 |
| P5R2 | 1 | 1.015 | 0 | 0 |
| P6R1 | 2 | 0.695 | 1.595 | 0 |
| P6R2 | 3 | 0.855 | 2.015 | 2.065 |
| P7R1 | 2 | 0.275 | 1.405 | 0 |
| P7R2 | 2 | 0.625 | 2.675 | 0 |

TABLE 8

| | Number(s) of arrest points | Arrest point position 1 | Arrest point position 2 |
|---|---|---|---|
| P1R1 | 0 | 0 | 0 |
| P1R2 | 0 | 0 | 0 |
| P2R1 | 0 | 0 | 0 |
| P2R2 | 0 | 0 | 0 |
| P3R1 | 0 | 0 | 0 |
| P3R2 | 0 | 0 | 0 |
| P4R1 | 1 | 0.725 | 0 |
| P4R2 | 0 | 0 | 0 |
| P5R1 | 0 | 0 | 0 |
| P5R2 | 1 | 1.435 | 0 |
| P6R1 | 1 | 1.095 | 0 |
| P6R2 | 1 | 1.345 | 0 |
| P7R1 | 2 | 0.485 | 2.225 |
| P7R2 | 1 | 1.365 | 0 |

Figure 6:
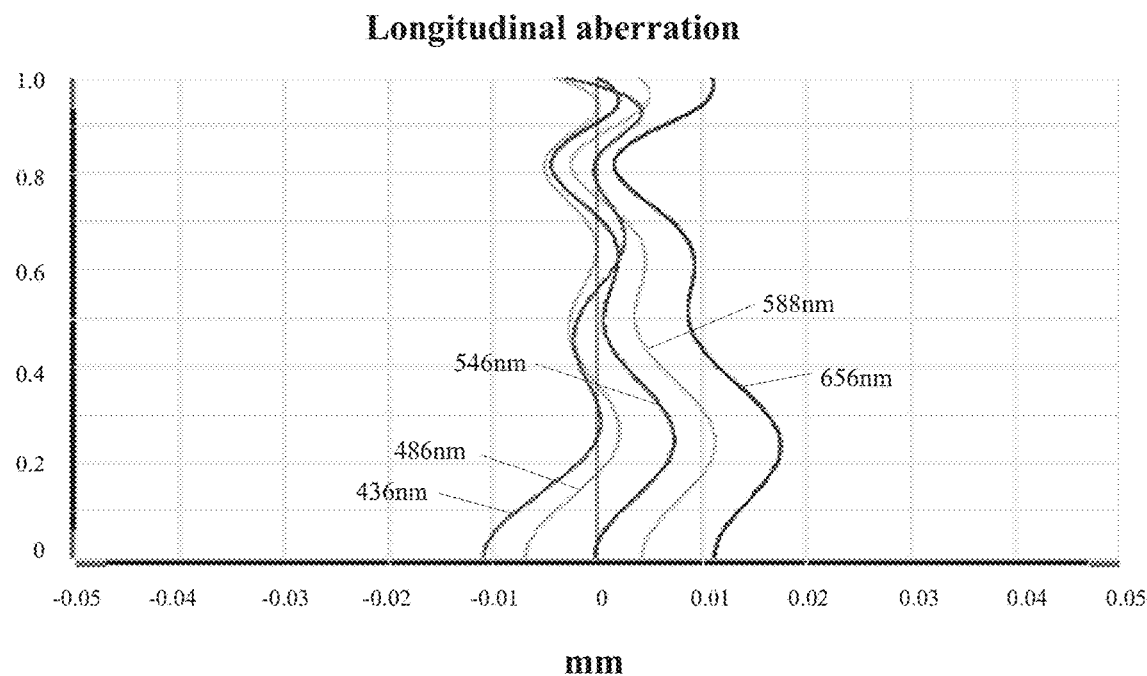
FIG. 6 is a schematic diagram of a longitudinal aberration of the camera optical lens shown in FIG. 5.
Figure 7:
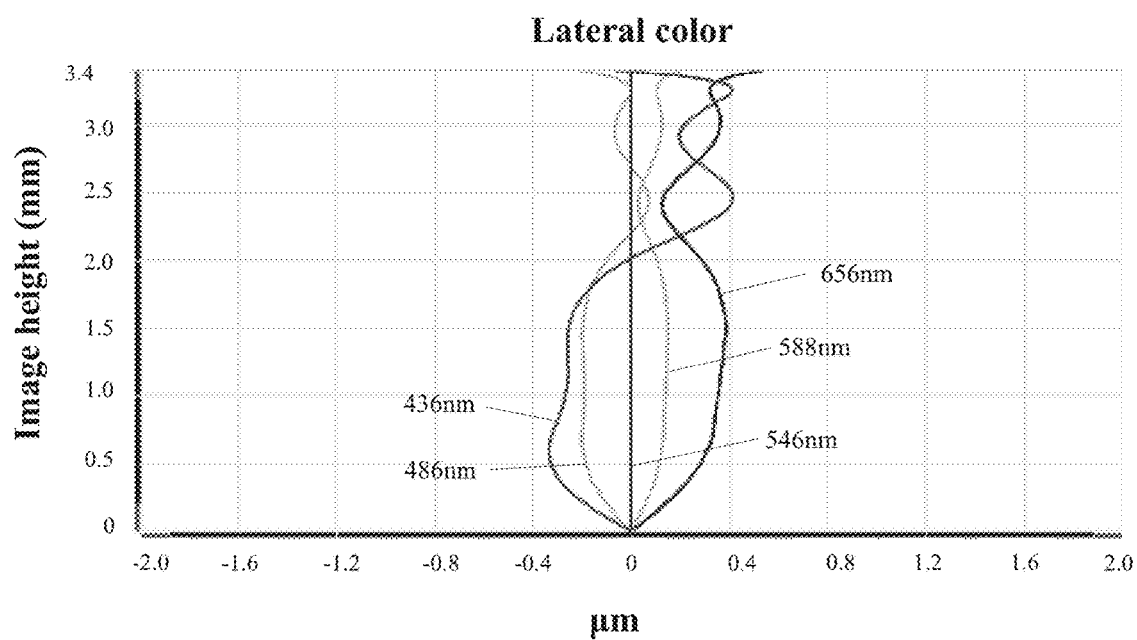
FIG. 7 is a schematic diagram of a lateral color of the camera optical lens shown in FIG. 5.
Figure 8:
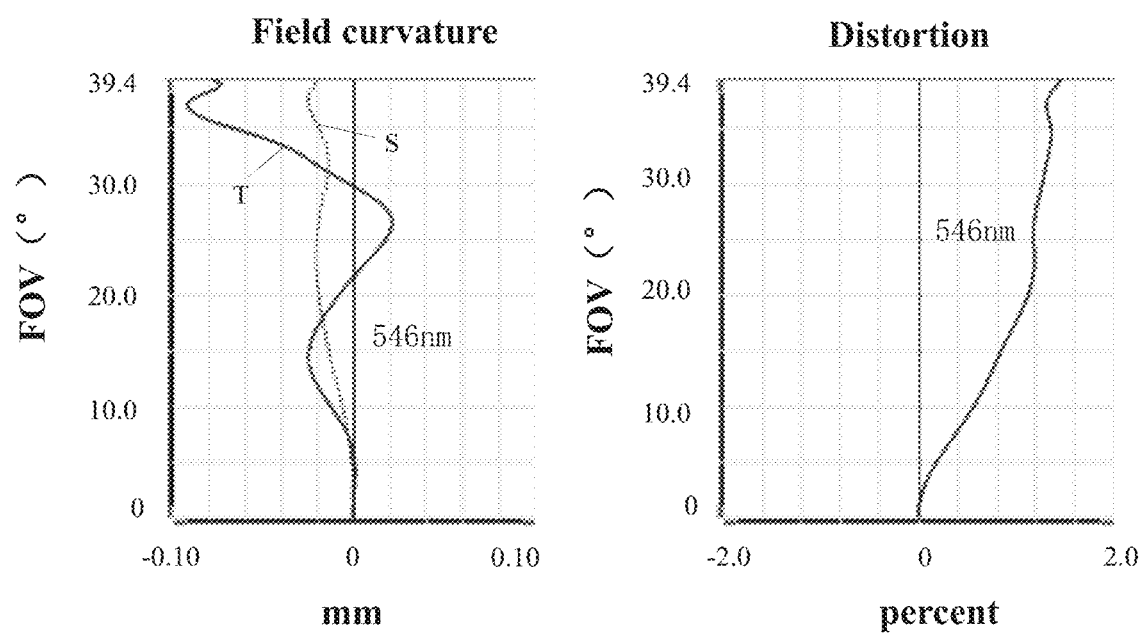
FIG. 8 is a schematic diagram of a field curvature and a distortion of the camera optical lens shown in FIG. 5.

FIG. 6 illustrates a longitudinal aberration of light with wavelengths of 436 nm, 486 nm, 546 nm, 588 nm and 656 nm after passing the camera optical lens 20. FIG. 7 illustrates a lateral color of light with wavelengths of 436 nm, 486 nm, 546 nm, 588 nm and 656 nm after passing the camera optical lens 20. FIG. 8 illustrates a field curvature and a distortion of light with a wavelength of 546 nm after passing the camera optical lens 20.

As shown in Table 13, Embodiment 2 satisfies the various conditions.

In this embodiment, an entrance pupil diameter of the camera optical lens 20 is 2.547 mm, an image height of 1.0 H is 3.400 mm, and an FOV (field of view) in the diagonal direction is 78.80°. Thus, the camera optical lens 20 achieves large aperture, wild angle and ultra-thinness, the on-axis and off-axis aberration is sufficiently corrected, thereby achieving excellent optical performance.

Embodiment 3

Figure 9:
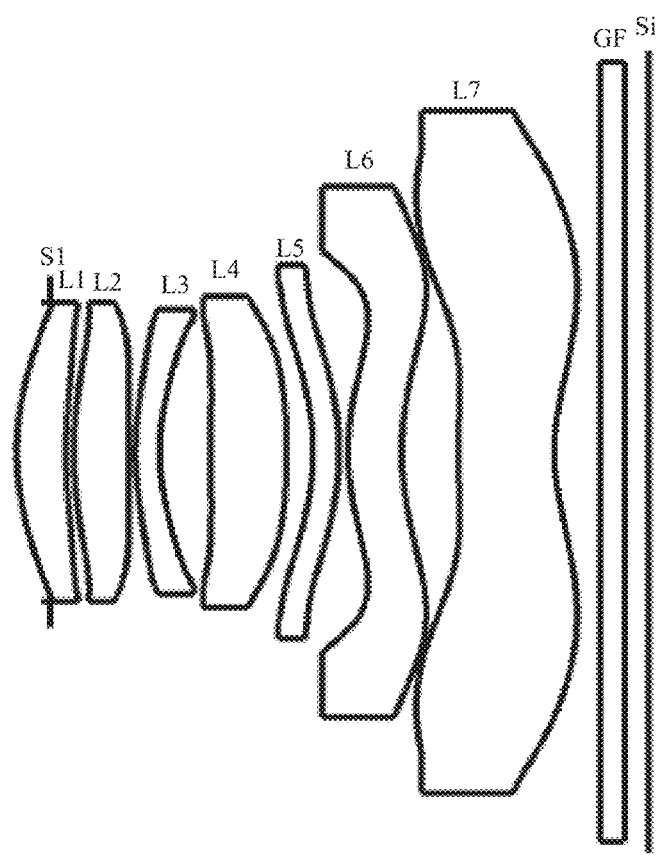
FIG. 9 is a schematic diagram of a structure of a camera optical lens according to Embodiment 3 of the present disclosure.

Embodiment 3, which provides a camera optical lens 30 structurally shown in FIG. 9, is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

| | R | d | | nd | | vd | |
|---|---|---|---|---|---|---|---|
| S1 | ∞ | d0 = | −0.280 | | | | |
| R1 | 2.337 | d1 = | 0.411 | nd1 | 1.5450 | v1 | 55.81 |
| R2 | 4.207 | d2 = | 0.065 | | | | |
| R3 | 3.284 | d3 = | 0.461 | nd2 | 1.4560 | v2 | 90.90 |
| R4 | 53.538 | d4 = | 0.051 | | | | |
| R5 | 2.531 | d5 = | 0.200 | nd3 | 1.6610 | v3 | 20.53 |
| R6 | 1.843 | d6 = | 0.426 | | | | |
| R7 | 24.551 | d7 = | 0.629 | nd4 | 1.5450 | v4 | 55.81 |
| R8 | −6.527 | d8 = | 0.223 | | | | |
| R9 | −2.086 | d9 = | 0.215 | nd5 | 1.6400 | v5 | 23.54 |
| R10 | −2.260 | d10 = | 0.073 | | | | |
| R11 | 2.119 | d11 = | 0.446 | nd6 | 1.5450 | v6 | 55.81 |
| R12 | 2.343 | d12 = | 0.472 | | | | |
| R13 | 4.976 | d13 | 0.798 | nd7 | 1.5346 | v7 | 55.69 |
| R14 | 1.787 | d14 | 0.378 | | | | |
| R15 | ∞ | d15 | 0.210 | ndg | 1.5168 | vg | 64.17 |
| R16 | ∞ | d16 | 0.193 | | | | |

Table 10 shows aspherical surface data of each lens of the camera optical lens 30 in Embodiment 3 of the present disclosure.

TABLE 10

| | Conic coefficient | Aspheric surface coefficients | | | |
|---|---|---|---|---|---|
| | k | A4 | A6 | A8 | A10 |
| R1 | −9.5105E−01 | −2.0707E−02 | 3.0437E−02 | −8.2570E−02 | 1.0232E−01 |
| R2 | −3.0341E+01 | −3.0095E−02 | −4.9560E−03 | 9.4964E−03 | 3.0084E−03 |
| R3 | −6.2572E+00 | −3.0864E−02 | 6.1732E−03 | 1.8092E−02 | −3.0095E−02 |
| R4 | 4.4062E+02 | −4.4742E−02 | 8.7060E−02 | −1.6827E−01 | 1.2257E−01 |
| R5 | −5.5901E−01 | −1.6682E−01 | 2.1676E−01 | −3.0824E−01 | 2.9055E−01 |
| R6 | 6.7467E−01 | −1.7895E−01 | 2.0291E−01 | −3.6310E−01 | 4.6924E−01 |
| R7 | −2.4115E+01 | −4.0103E−02 | −7.9404E−03 | −1.3258E−02 | 2.0939E−02 |
| R8 | 1.8953E+01 | −8.9100E−02 | 6.6214E−02 | −7.4727E−02 | 3.1011E−02 |
| R9 | −5.7272E−01 | 7.2166E−02 | 2.8772E−03 | −9.8714E−02 | 1.3075E−01 |
| R10 | −3.2540E−01 | 9.4731E−02 | −9.7645E−02 | 7.9236E−02 | −3.5082E−02 |
| R11 | −1.0372E+01 | 5.2863E−02 | −1.0185E−01 | 5.8770E−02 | −2.8506E−02 |
| R12 | −1.5383E+01 | 4.6678E−02 | −4.3552E−02 | 8.5816E−03 | −4.9999E−04 |
| R13 | 1.1623E+00 | −2.0880E−01 | 8.0471E−02 | −1.4923E−02 | 1.3979E−03 |
| R14 | −6.6673E−01 | −1.8726E−01 | 7.9018E−02 | −2.7273E−02 | 6.0998E−03 |

TABLE 10-continued

| | Aspheric surface coefficients | | | | |
|---|---|---|---|---|---|
| | A12 | A14 | A16 | A18 | A20 |
| R1 | −6.8372E−02 | 2.1945E−02 | −3.8735E−04 | −1.3344E−03 | 1.9333E−04 |
| R2 | −6.0694E−04 | −1.0253E−03 | −2.2568E−04 | 2.6692E−04 | 7.0046E−05 |
| R3 | 2.0431E−02 | −6.5534E−03 | −4.6170E−03 | 4.2182E−03 | −8.8246E−04 |
| R4 | −4.5463E−02 | 1.0073E−02 | −1.7067E−03 | −1.5080E−04 | 9.6790E−05 |
| R5 | −1.4522E−01 | 2.3281E−02 | 2.0742E−02 | −1.3158E−02 | 2.0068E−03 |
| R6 | −3.6453E−01 | 1.4822E−01 | −2.2453E−02 | 5.7047E−03 | −3.4798E−03 |
| R7 | −2.1819E−02 | 3.9408E−03 | 3.4624E−03 | 2.1909E−03 | −7.0501E−04 |
| R8 | 1.5836E−02 | −1.5869E−02 | 3.5176E−03 | −3.7460E−04 | 2.7996E−04 |
| R9 | −6.3969E−02 | 1.0921E−02 | 8.3844E−05 | 2.2240E−04 | −1.2839E−04 |
| R10 | 1.1564E−02 | −2.0388E−03 | −3.4005E−05 | −6.0498E−05 | 3.0721E−05 |
| R11 | 6.8537E−03 | −4.1187E−04 | −4.7539E−05 | −2.0161E−05 | 7.3488E−06 |
| R12 | 2.0561E−05 | −3.5813E−06 | −3.4729E−07 | −2.4815E−08 | 1.1787E−08 |
| R13 | −3.8431E−05 | −4.0631E−06 | 2.9352E−07 | 3.1999E−09 | −5.0305E−10 |
| R14 | −8.3133E−04 | 6.5232E−05 | −2.8101E−06 | 7.7602E−08 | −2.1220E−09 |

Table 11 and Table 12 show design data inflexion points and arrest points of each lens in the camera optical lens 30 in Embodiment 3 of the present disclosure.

TABLE 11

| | Number(s) of inflexion points | Inflexion point position 1 | Inflexion point position 2 | Inflexion point position 3 |
|---|---|---|---|---|
| P1R1 | 0 | 0 | 0 | 0 |
| P1R2 | 2 | 0.595 | 0.905 | 0 |
| P2R1 | 1 | 0.845 | 0 | 0 |
| P2R2 | 1 | 0.215 | 0 | 0 |
| P3R1 | 0 | 0 | 0 | 0 |
| P3R2 | 0 | 0 | 0 | 0 |
| P4R1 | 2 | 0.285 | 1.055 | 0 |
| P4R2 | 1 | 1.205 | 0 | 0 |
| P5R1 | 2 | 0.915 | 1.315 | 0 |
| P5R2 | 2 | 0.965 | 1.435 | 0 |
| P6R1 | 2 | 0.705 | 1.635 | 0 |
| P6R2 | 3 | 0.835 | 2.005 | 2.125 |
| P7R1 | 2 | 0.305 | 1.395 | 0 |
| P7R2 | 2 | 0.635 | 2.645 | 0 |

TABLE 12

| | Number(s) of arrest points | Arrest point position 1 | Arrest point position 2 |
|---|---|---|---|
| P1R1 | 0 | 0 | 0 |
| P1R2 | 0 | 0 | 0 |
| P2R1 | 1 | 1.165 | 0 |
| P2R2 | 1 | 0.385 | 0 |
| P3R1 | 0 | 0 | 0 |
| P3R2 | 0 | 0 | 0 |
| P4R1 | 1 | 0.485 | 0 |
| P4R2 | 0 | 0 | 0 |
| P5R1 | 0 | 0 | 0 |
| P5R2 | 0 | 0 | 0 |
| P6R1 | 1 | 1.125 | 0 |
| P6R2 | 1 | 1.375 | 0 |
| P7R1 | 2 | 0.535 | 2.175 |
| P7R2 | 1 | 1.395 | 0 |

Figure 10:
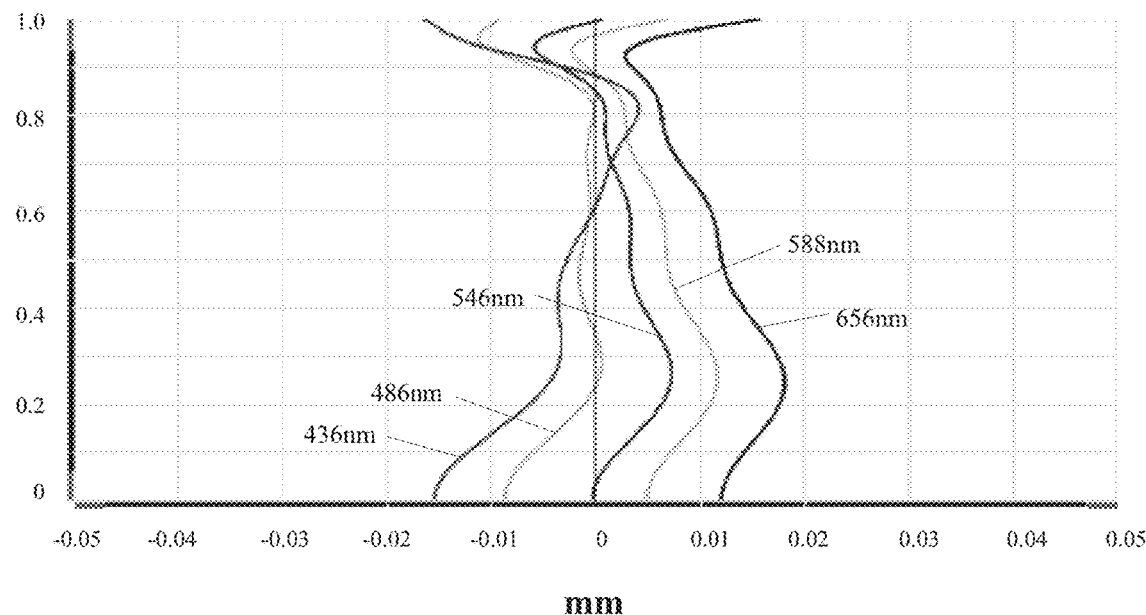
FIG. 10 is a schematic diagram of a longitudinal aberration of the camera optical lens shown in FIG. 9.
Figure 11:
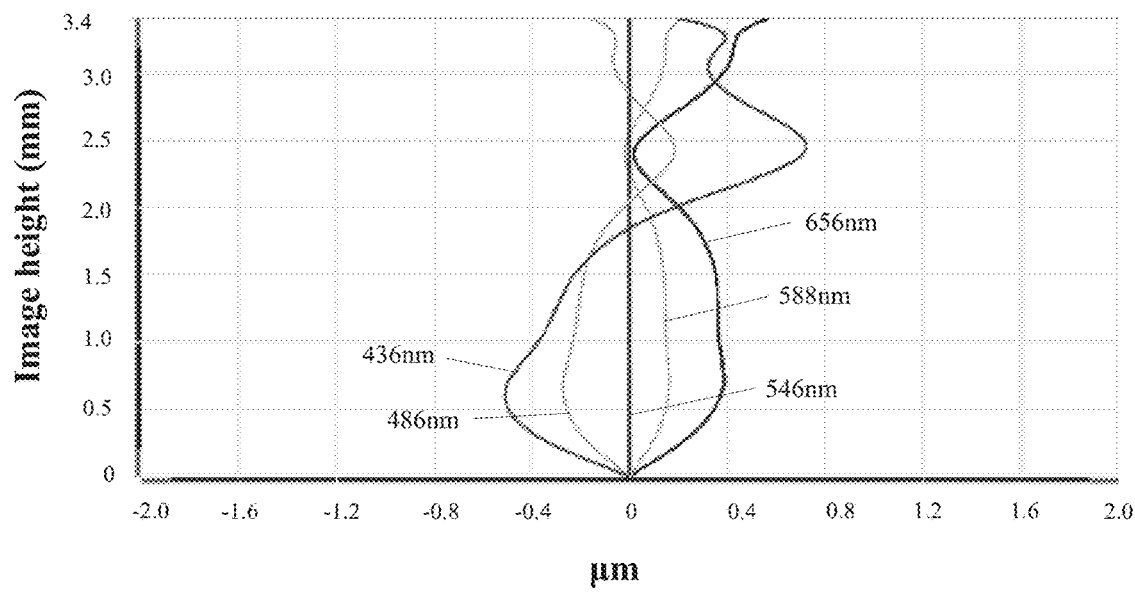
FIG. 11 is a schematic diagram of a lateral color of the camera optical lens shown in FIG. 9.
Figure 12:
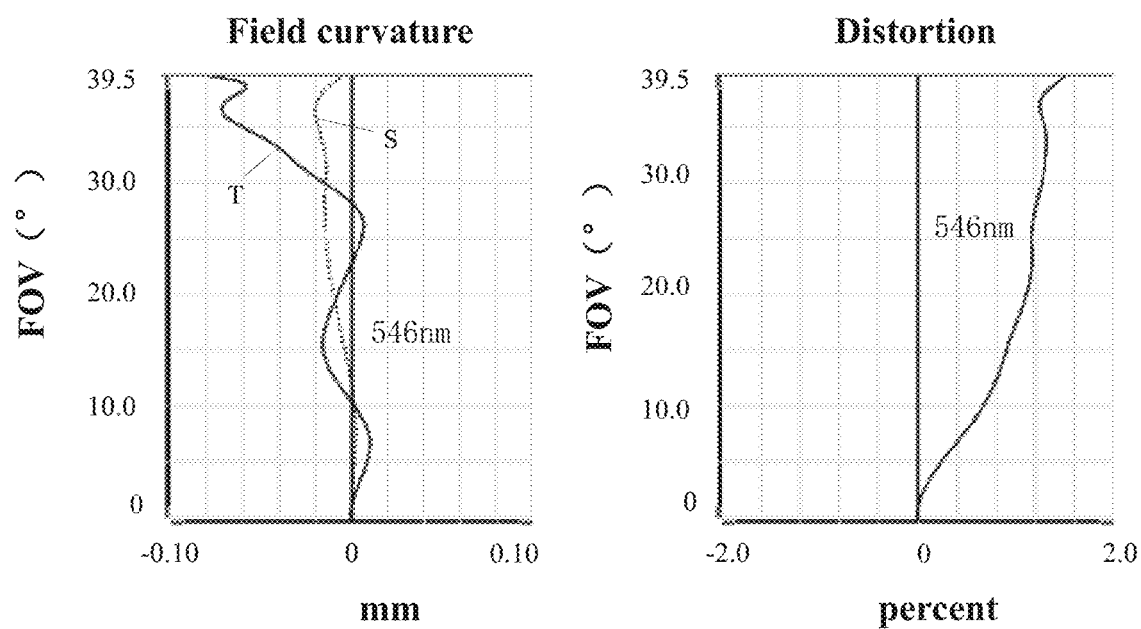
FIG. 12 is a schematic diagram of a field curvature and a distortion of the camera optical lens shown in FIG. 9.

FIG. 10 illustrates a longitudinal aberration of light with wavelengths of 436 nm, 486 nm, 546 nm, 588 nm and 656 nm after passing the camera optical lens 30. FIG. 11 illustrates a lateral color of light with wavelengths of 436 nm, 486 nm, 546 nm, 588 nm and 656 nm after passing the camera optical lens 30. FIG. 12 illustrates a field curvature and a distortion of light with a wavelength of 546 nm after passing the camera optical lens 30.

Table 13 in the following shows values corresponding to the conditions according to the aforementioned conditions in the present embodiment. Apparently, the camera optical system in the present embodiment satisfies the aforementioned conditions.

In this embodiment, an entrance pupil diameter of the camera optical lens 30 is 2.537 mm, an image height of 1.0 H is 3.400 mm, and an FOV (field of view) in the diagonal direction is 79.00°. Thus, the camera optical lens 30 achieves large aperture, wild angle and ultra-thinness, the on-axis and off-axis aberration is sufficiently corrected, thereby achieving excellent optical performance.

TABLE 13

| Parameters and conditions | Embodiment 1 | Embodiment 2 | Embodiment 3 |
|---|---|---|---|
| f | 4.176 | 4.075 | 4.060 |
| f1 | 5.708 | 18.367 | 8.914 |
| f2 | 9.633 | 4.410 | 7.630 |
| f3 | −7.673 | −8.330 | −11.482 |
| f4 | 9.952 | 11.965 | 9.490 |
| f5 | −45.495 | −32.641 | −81.026 |
| f6 | 14.481 | 11.909 | 23.771 |
| f7 | −5.279 | −5.258 | −5.689 |
| f12 | 3.719 | 3.726 | 4.265 |
| f5/f | −10.89 | −8.01 | −19.96 |
| v2/v3 | 3.27 | 2.84 | 4.43 |
| (R9 + R10)/(R9 − R10) | −14.92 | −14.06 | −24.98 |
| Fno | 1.60 | 1.60 | 1.60 |

It will be understood by those of ordinary skill in the art that the embodiments described above are specific embodiments realizing the present disclosure, and that in practical applications, various changes may be made thereto in form and in detail without departing from the range and scope of the disclosure.

What is claimed is:
1. A camera optical lens comprising, from an object side to an image side:
a first lens having a positive refractive power;
a second lens having a positive refractive power;
a third lens having a negative refractive power;

a fourth lens having a positive refractive power;
a fifth lens having a negative refractive power;
a sixth lens having a positive refractive power; and
a seventh lens having a negative refractive power;
wherein the camera optical lens satisfies following conditions:

$-20.00 \leq f5/f \leq -8.00$;

$2.80 \leq v2/v3 \leq 4.50$; and $-25.00 \leq (R9+R10)/(R9-R10) \leq -14.00$;

where
f5 denotes a focal length of the fifth lens;
f denotes a focal length of the camera optical lens;
v2 denotes an abbe number of the second lens;
v3 denotes an abbe number of the third lens;
R9 denotes a curvature radius of the object-side surface of the fifth lens; and
R10 denotes a curvature radius of the image-side surface of the fifth lens.

2. The camera optical lens according to claim 1, wherein the camera optical lens further satisfies a condition of:

$9.00 \leq d3/d4 \leq 15.00$;

where
d3 denotes an on-axis thickness of the second lens; and
d4 denotes an on-axis distance from the image-side surface of the second lens to the object-side surface of the third lens.

3. The camera optical lens according to claim 1, wherein the camera optical lens further satisfies following conditions:

$-20.00 \leq (R11+R12)/(R11-R12) \leq -6.00$;

where
R11 denotes a curvature radius of the object-side surface of the sixth lens; and
R12 denotes a curvature radius of the image-side surface of the sixth lens.

4. The camera optical lens according to claim 1, wherein the camera optical lens further satisfies following conditions:

$0.68 \leq f1/f \leq 6.76$;

$-20.74 \leq (R1+R2)/(R1-R2) \leq -1.35$; and $0.03 \leq d1/TTL \leq 0.14$;

where
f1 denotes a focal length of the first lens;
R1 denotes a curvature radius of the object-side surface of the first lens; and
R2 denotes a curvature radius of the image-side surface of the first lens;
d1 denotes an on-axis thickness of the first lens; and
TTL denotes a total optical length from the object-side surface of the first lens to an image surface of the camera optical lens along an optical axis.

5. The camera optical lens according to claim 1, wherein the camera optical lens further satisfies following conditions:

$0.54 \leq f2/f \leq 3.46$;

$-2.26 \leq (R3+R4)/(R3-R4) \leq -0.55$; and $0.04 \leq d3/TTL \leq 0.19$;

where
f2 denotes a focal length of the second lens;
R3 denotes a curvature radius of the object-side surface of the second lens;
R4 denotes a curvature radius of the image-side surface of the second lens;
d3 denotes an on-axis thickness of the second lens; and
TTL denotes a total optical length from the object-side surface of the first lens to an image surface of the camera optical lens along an optical axis.

6. The camera optical lens according to claim 1, wherein the camera optical lens further satisfies following conditions:

$-5.66 \leq f3/f \leq -1.22$;

$1.67 \leq (R5+R6)/(R5-R6) \leq 9.54$; and $0.02 \leq d5/TTL \leq 0.06$;

where
f3 denotes a focal length of the third lens;
R5 denotes a curvature radius of the object-side surface of the third lens;
R6 denotes a curvature radius of the image-side surface of the third lens;
d5 denotes an on-axis thickness of the third lens; and
TTL denotes a total optical length from the object-side surface of the first lens to an image surface of the camera optical lens along an optical axis.

7. The camera optical lens according to claim 1, wherein the camera optical lens further satisfies following conditions:

$1.17 \leq f4/f \leq 4.40$;

$-0.64 \leq (R7+R8)/(R7-R8) \leq 0.87$; and $0.04 \leq d7/TTL \leq 0.18$;

where
f4 donates a focal length of the fourth lens;
R7 denotes a curvature radius of the object-side surface of the fourth lens;
R8 denotes a curvature radius of the image-side surface of the fourth lens;
d7 denotes an on-axis thickness of the fourth lens; and
TTL denotes a total optical length from the object-side surface of the first lens to an image surface of the camera optical lens along an optical axis.

8. The camera optical lens according to claim 1, wherein the camera optical lens further satisfies a condition of:

$1.46 \leq f6/f \leq 8.78$;

$0.04 \leq d11/TTL \leq 0.15$;

where
f6 denotes a focal length of the sixth lens;
d11 denotes an on-axis thickness of the sixth lens; and
TTL denotes a total optical length from the object-side surface of the first lens to an image surface of the camera optical lens along an optical axis.

9. The camera optical lens according to claim 1, wherein the camera optical lens further satisfies a condition of:

$-2.80 \leq f7/f \leq -0.84$;

$0.93 \leq (R13+R14)/(R13-R14) \leq 3.18$; and $0.07 \leq d13/TTL \leq 0.23$;

where f7 donates a focal length of the seventh lens;

R13 donates a curvature radius of the object-side surface of the seventh lens;

R14 donates a curvature radius of the image-side surface of the seventh lens;

d13 donates an on-axis thickness of the seventh lens; and

TTL denotes a total optical length from the object-side surface of the first lens to an image surface of the camera optical lens along an optical axis.

10. The camera optical lens according to claim 1, wherein the camera optical lens further satisfies a condition of:

$Fno \leq 1.61;$ where

Fno denotes an F number of the camera optical lens.

\* \* \* \* \*